(12) United States Patent
Gormley (10) Patent No.: US 11,891,966 B2
(45) Date of Patent: *Feb. 6, 2024

(54) DEPLOYABLE FAIRING FOR DOOR REVERSERS SYSTEMS AND METHODS

(71) Applicant: ROHR, INC, Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,418

(22) Filed: Mar. 8, 2022

(65) Prior Publication Data

US 2022/0349362 A1 Nov. 3, 2022

Related U.S. Application Data

(62) Division of application No. 16/560,716, filed on Sep. 4, 2019, now Pat. No. 11,300,077.

(60) Provisional application No. 62/740,328, filed on Oct. 2, 2018.

(51) Int. Cl.
*F02K 1/76* (2006.01)
*F02K 1/60* (2006.01)
*F02K 1/62* (2006.01)
*F02K 1/70* (2006.01)

(52) U.S. Cl.
CPC ............... *F02K 1/763* (2013.01); *F02K 1/60* (2013.01); *F02K 1/62* (2013.01); *F02K 1/70* (2013.01); *F05D 2220/323* (2013.01); *F05D 2220/36* (2013.01); *F05D 2250/71* (2013.01)

(58) Field of Classification Search
CPC ... F02K 1/70; F02K 1/763; F02K 1/60; F02K 1/605

See application file for complete search history.

(56) References Cited

U.S. PATENT DOCUMENTS

| | | | |
|---|---|---|---|
| 3,164,956 A | | 1/1965 | Colebrook |
| 3,386,247 A | * | 6/1968 | Gross .................. F02K 1/74 60/229 |
| 3,532,275 A | | 10/1970 | Hom |
| 3,797,785 A | | 3/1974 | Baerresen |
| 3,863,867 A | | 2/1975 | Souslin |
| 4,422,605 A | | 12/1983 | Fage |

(Continued)

FOREIGN PATENT DOCUMENTS

| | | |
|---|---|---|
| EP | 0574730 | 12/1993 |
| EP | 1903205 | 3/2008 |

(Continued)

OTHER PUBLICATIONS

European Patent Office, European Office Action dated Apr. 8, 2022 in Application No. 19195975.8.

(Continued)

*Primary Examiner* — Andrew H Nguyen
(74) *Attorney, Agent, or Firm* — SNELL & WILMER L.L.P.

(57) ABSTRACT

A thrust reverser may include a frame, an actuation arrangement, a reverser door pivotally coupled to the frame, and a deployable fairing pivotally coupled to the frame, wherein the deployable fairing is configured to move away from a central axis of the thrust reverser to provide clearance for one of more thrust reverser pivot doors to rotate into a deployed position.

19 Claims, 5 Drawing Sheets

(56) References Cited

U.S. PATENT DOCUMENTS

| | | | | |
|---|---|---|---|---|
| 4,485,970 A * | 12/1984 | Fournier | ............... | F02K 1/70 |
| | | | | 239/265.29 |
| 4,519,561 A | 5/1985 | Timms | | |
| 5,392,991 A | 2/1995 | Gatti et al. | | |
| 5,730,392 A | 3/1998 | Lair | | |
| 6,170,255 B1 | 1/2001 | Gonidec | | |
| 6,289,670 B1 * | 9/2001 | Charier | ............... | F02K 1/60 |
| | | | | 60/230 |
| 6,487,845 B1 | 12/2002 | Modglin et al. | | |
| 7,104,500 B1 | 9/2006 | Smith | | |
| 7,735,778 B2 | 6/2010 | Lair et al. | | |
| 8,172,175 B2 | 5/2012 | Lair | | |
| 8,434,715 B2 | 5/2013 | Lair | | |
| 9,970,388 B2 | 5/2018 | Chandler et al. | | |
| 2002/0158146 A1 * | 10/2002 | Lair | ............... | F02K 1/006 |
| | | | | 60/228 |
| 2008/0295519 A1 | 12/2008 | Park | | |
| 2015/0121839 A1 | 5/2015 | Chandler | | |
| 2016/0146113 A1 * | 5/2016 | Zatorski | ............... | F01D 25/06 |
| | | | | 415/151 |
| 2017/0321632 A1 | 11/2017 | Howarth et al. | | |

FOREIGN PATENT DOCUMENTS

| | | |
|---|---|---|
| EP | 2060765 | 5/2009 |
| FR | 3025256 | 3/2016 |

OTHER PUBLICATIONS

European Patent Office, European Search Report dated Jan. 29, 2020 in Application No. 19195975.8.
European Patent Office, European Search Report dated Feb. 5, 2020 in Application No. 19196050.9.
European Patent Office, European Search Report dated Feb. 5, 2020 in Application No. 19196031.9.
UAPTO, Pre-Interview First Office Action dated Aug. 12, 2021 in U.S. Appl. No. 16/560,673.
USPTO, Pre-Interview First Office Action dated Aug. 13, 2021 in U.S. Appl. No. 16/560,866.
USPTO, First Action Interview Office Action dated Sep. 20, 2021 in U.S. Appl. No. 16/560,673.
USPTO, First Action Interview Office Action dated Sep. 20, 2021 in U.S. Appl. No. 16/560,866.
USPTO, Notice of Allowance dated Jan. 21, 2022 in U.S. Appl. No. 16/560,866.
USPTO, Notice of Allowance dated Feb. 9, 2022 in U.S. Appl. No. 16/560,673.
USPTO, Notice of Allowance dated Dec. 13, 2021 in U.S. Appl. No. 16/560,716.
USPTO, Pre-Interview First Office Action dated Aug. 11, 2021 in U.S. Appl. No. 16/560,716.
USPTO, Supplemental Notice of Allowance dated Dec. 27, 2021 in U.S. Appl. No. 16/560,716.
USPTO, First Action Interview Office Action dated Sep. 20, 2021 in U.S. Appl. No. 16/560,716.
USPTO, Non-Final Office Action dated May 24, 2023 in U.S. Appl. No. 17/720,519.
USPTO, Non-Final Office Action dated May 31, 2023 in U.S. Appl. No. 17/734,941.
USPTO, Notice of Allowance dated Sep. 21, 2023 in U.S. Appl. No. 17/720,519.
USPTO, Notice of Allowance dated Oct. 26, 2023 in U.S. Appl. No. 17/720,519.
USPTO, Notice of Allowance dated Nov. 1, 20233 in U.S. Appl. No. 17/734,941.

* cited by examiner

DEPLOYABLE FAIRING FOR DOOR REVERSERS SYSTEMS AND METHODS

CROSS REFERENCE TO RELATED APPLICATIONS

This application is a divisional of, and claims priority to, and the benefit of U.S. patent application Ser. No. 16/560,716, entitled "DEPLOYABLE FAIRING FOR DOOR REVERSERS SYSTEMS AND METHODS," filed on Sep. 4, 2019. The '716 application is a nonprovisional of, and claims priority to, and the benefit of, U.S. Provisional Patent Application Ser. No. 62/740,328, entitled "DEPLOYABLE FAIRING FOR DOOR REVERSERS," filed on Oct. 2, 2018. All of which are incorporated by reference herein in their entirety for all purposes.

FIELD

The present disclosure relates generally to aircraft thrust reversers used with gas turbine engines and, more particularly, to pivot door thrust reversers.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include a thrust reverser capable of redirecting the mixed exhaust stream from a rearward direction to, at least partially, a forward direction thus producing a rearward thrust that may serve to decelerate forward motion of an aircraft and thereby assist braking the aircraft upon landing. Pivot door thrust reversers may be used with turbofan gas turbine engines for aircraft, including for corporate or business jets. Pre-exit pivot door thrust reversers may generally be characterized as including thrust reverser doors having trailing edges positioned forward of the exit plane of an exhaust duct, while post-exit pivot door thrust reversers may generally be characterized as including thrust reverser doors having trailing edges that form at least a portion of the exit plane of an exhaust duct.

SUMMARY

An actuation arrangement for a thrust reverser is disclosed, comprising a bell crank configured to be pivotally coupled to a frame of the thrust reverser, a first link, and a second link, wherein the bell crank is configured to move a deployable fairing between a first position and a second position in response to a reverser door rotating with respect to the frame.

In various embodiments, a first end of the first link is configured to be pivotally coupled to a first pivot point of the bell crank and a second end of the first link is configured to be pivotally coupled to a hinge member.

In various embodiments, the reverser door is pivotally coupled to the frame via the hinge member.

In various embodiments, a first end of the second link is configured to be pivotally coupled to a second pivot point of the bell crank and a second end of the second link is configured to be pivotally coupled to the deployable fairing.

In various embodiments, the actuation arrangement further comprises a hinge, the bell crank configured to rotate about the hinge.

In various embodiments, the bell crank is configured to be pivotally coupled to the frame via the hinge.

In various embodiments, the bell crank is driven by the hinge member.

In various embodiments, the bell crank is configured to move the deployable fairing between the first position and the second position, via the second link, in response to the bell crank being rotated via the first link.

A thrust reverser is disclosed, comprising a frame, a reverser door pivotally coupled to the frame, and a deployable fairing pivotally coupled to the frame, wherein the deployable fairing is configured to move away from a central axis of the thrust reverser to provide clearance for the reverser door to rotate into a deployed position.

In various embodiments, the deployable fairing is configured to move with respect to the frame to a first position in response to the reverser door rotating about the frame in a first rotational direction, and the deployable fairing is configured to move with respect to the frame to a second position in response to the reverser door rotating about the frame in a second rotational direction.

In various embodiments, the thrust reverser further comprises an actuation arrangement coupled to the deployable fairing, the actuation arrangement comprising a bell crank pivotally coupled to the frame, a first link, and a second link.

In various embodiments, a first end of the first link is pivotally coupled to a first pivot point of the bell crank and a second end of the first link is pivotally coupled to a hinge member of the reverser door.

In various embodiments, a first end of the second link is pivotally coupled to a second pivot point of the bell crank and a second end of the second link is pivotally coupled to the deployable fairing.

In various embodiments, the actuation arrangement further comprises a hinge, the bell crank configured to rotate about the hinge.

In various embodiments, the bell crank is pivotally coupled to the frame via the hinge.

In various embodiments, the bell crank is configured to move the deployable fairing between the first position and the second position, via the second link, in response to the bell crank being rotated via the first link.

In various embodiments, a forward end of the deployable fairing is pivotally coupled to the frame.

In various embodiments, the actuation arrangement comprises a linear actuator, a first end of the linear actuator is pivotally coupled to the frame and a second end of the linear actuator is pivotally coupled to the deployable fairing, wherein the deployable fairing is moveable between a first position and a second position in response to the linear actuator at least one of extending or retracting.

A method for deploying a thrust reverser is disclosed, comprising rotating a deployable fairing with respect to a frame, and rotating a first reverser door with respect to the frame.

In various embodiments, the method further comprises rotating a second reverser door with respect to the frame.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Modern business jets typically use door type thrust reverses which typically provide high efficiency by reversing the core airflow as well as the bypass airflow. To achieve said high efficiency, it is desirable to deploy the doors such that the trailing edges are in close proximity (or overlap) when fully deployed. To achieve this, it is typically desirable to locate the door hinges relatively close together and relatively far aft in the thrust reverser nozzle. Since space is typically limited and the doors and hinges need to be located close together, it may be desirable to have the doors occupy the same space at various points during the deploy/stow cycle.

In various embodiments, a thrust reverser, as provided herein, includes a deployable fairing configured to move away from a central axis of the thrust reverser to provide clearance for one of more thrust reverser pivot doors to rotate into a deployed position. The deployable fairing may be actuated via an actuation arrangement dependent on the rotational position of one or more of the reverser doors or may be actuated independent from the rotational position of the reverser doors.

A deployable fairing, as provided herein, may comprise a robust design that is not limited by space constraint at the trailing edge. A deployable fairing, as provided herein, may be used with side or center actuation. A deployable fairing, as provided herein, may be used independently of the (hinge line location) type of reverser. A deployable fairing, as provided herein, may provide additional space for the thrust reverser structure, hinges, and pivot doors. A deployable fairing, as provided herein, may provide clean trim lines and unwanted loft protrusions. A deployable fairing, as provided herein, may eliminate large gaps at the trailing edge of the thrust reverser.

Figure 1:
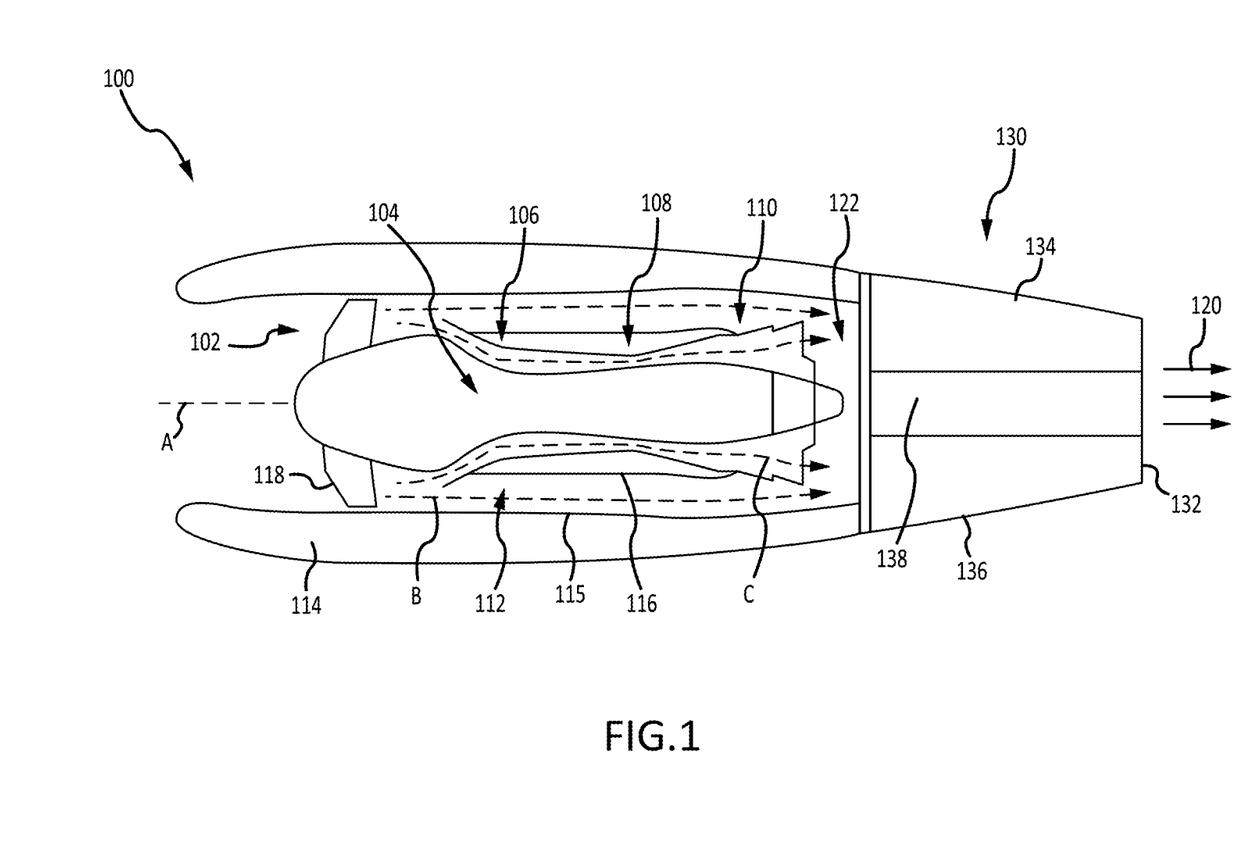
FIG. 1 provides a schematic view of a gas turbine engine, in accordance with various embodiments.

Referring now to the drawings, FIG. 1 schematically illustrates a gas turbine engine 100 of a mixed flow turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a stowed position (also referred to as a closed position or a retracted position), as illustrated in FIG. 1. The thrust reverser 130 further includes an upper reverser door 134, a lower reverser door 136 and a pair of opposing fairings 138, which may house actuator componentry and connecting members used to open and close the upper reverser door 134 and the lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 exiting the thrust reverser 130 while in an open or deployed position provides the reverse thrust used to decelerate an aircraft upon landing or during a rejected takeoff.

Figure 2A:
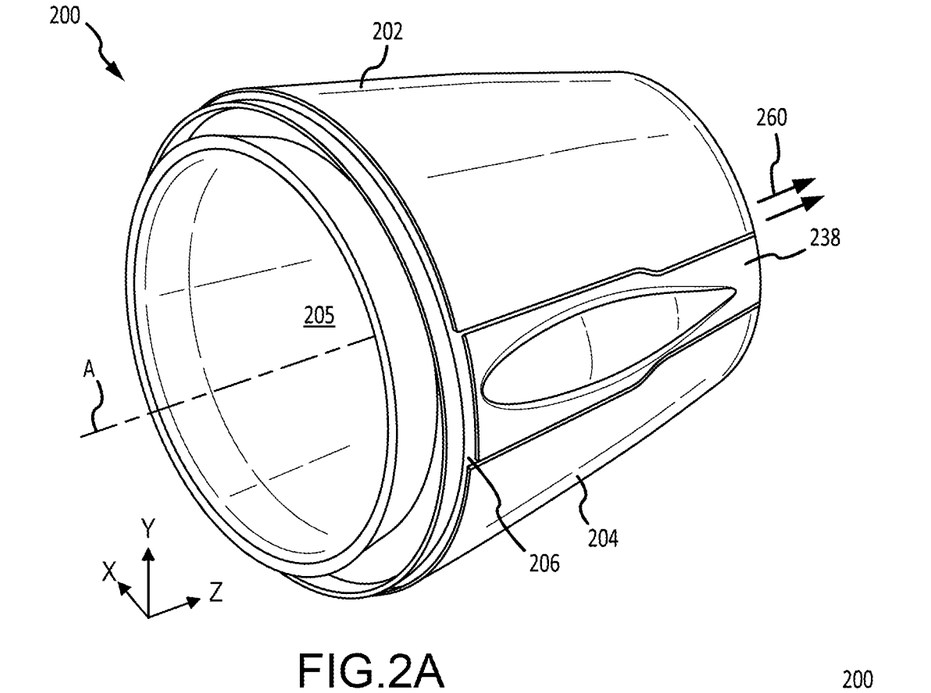
FIG. 2A provides an isometric view of a thrust reverser in a stowed position, in accordance with various embodiments.
Figure 2B:
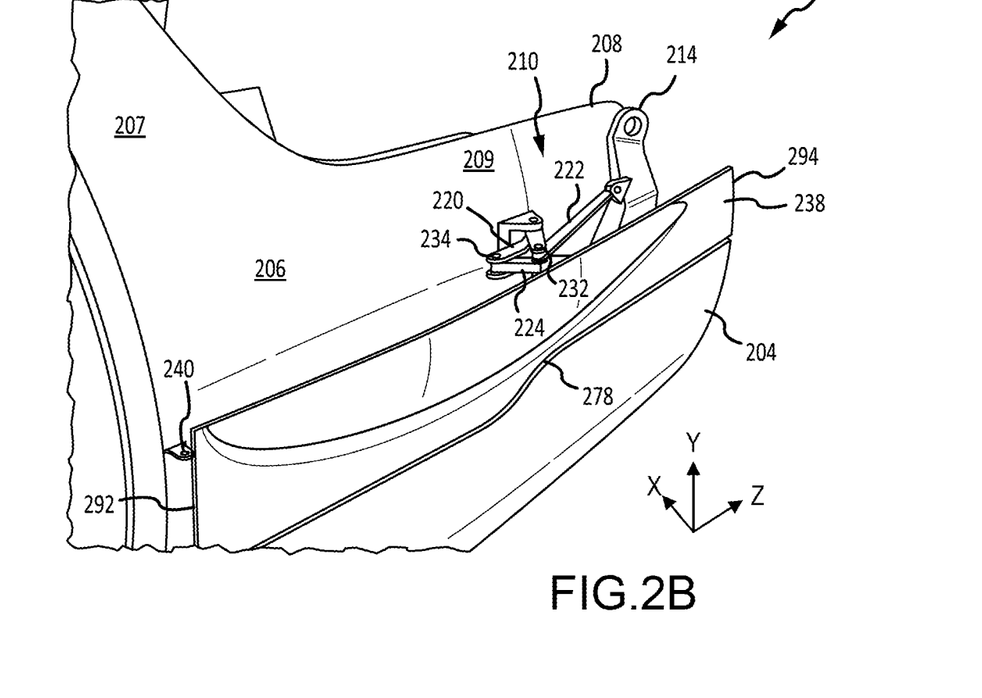
FIG. 2B provides an isometric view of the thrust reverser of FIG. 2A, with the upper reverser door and an upper portion of the deployable fairing removed for clarity purposes, in accordance with various embodiments.

Referring now to FIG. 2A and FIG. 2B, perspective views of a thrust reverser 200 in a stowed position are illustrated, in accordance with various embodiments. The thrust reverser 200 includes an upper reverser door 202, a lower reverser door 204, and a frame 206. In various embodiments, the frame 206 includes an annular structure 207 with a pair of opposing side beams 208 extending from the annular structure 207. The pair of opposing side beams 208 may include a port side beam 209 and a starboard side beam. The pair of opposing side beams 208 may provide a structural support for mounting related components and operating the thrust reverser 200 between deployed and retracted positions. Upper reverser door 202 is moveable relative to frame 206. Lower reverser door 204 is moveable relative to frame 206.

With particular focus on FIG. 2B, lower reverser door 204 may be rotatably coupled to frame 206 via a hinge member 214. Upper reverser door 202 is omitted in various drawings for clarity purposes. However, upper reverser door 202 may be similarly rotatably coupled to frame 206 via a hinge member.

A deployable fairing 238 is coupled to frame 206. A section view of deployable fairing 238, with the upper half of deployable fairing 238 removed, is provided in various drawings (e.g., FIG. 2B) for clarity purposes in order to clearly illustrate an actuation arrangement 210 for deploying or actuating the deployable fairing. In the stowed position, deployable fairing 238 may provide an aerodynamic surface extending between, and generally flush with upper reverser door 202 and lower reverser door 204. A peripheral edge 278 of deployable fairing 238 facing lower reverser door 204 may be oriented generally parallel the fore-aft direction (Z-direction) along the entire length (i.e., from forward edge 292 to aft edge 294) of deployable fairing 238, thereby maximizing the aerodynamic efficiency of thrust reverser 200 and reducing overall drag. In the deployed position, deployable fairing 238 may rotate outwards (i.e., away from central axis A) to provide additional space for upper reverser door 202 and lower reverser door 204 to deploy, thereby preventing upper reverser door 202 and/or lower reverser door 204 from physically contacting or clashing with deployable fairing 238.

In various embodiments, an actuation arrangement 210 is mounted to the port side beam 209. In various embodiments, a second actuation arrangement is mounted to the starboard side beam. The second actuation arrangement may be similar to actuation arrangement 210 and the two actuation arrangements may be generally symmetric about central axis A. Stated differently, the starboard side actuation arrangement and side beam configuration may be symmetrical with the port side actuation arrangement and side beam configuration described herein. In this regard, although described herein with respect to the port side, it should be understood that the starboard side may comprise a similar arrangement as the port side.

With reference to FIGS. 2A, 2B, 2C, and 2D, in response to the thrust reverser 200 assuming the closed or stowed position, e.g., during flight, the upper reverser door 202 and the lower reverser door 204 are rotated to their closed positions (see FIG. 2A and FIG. 2B). The outer surfaces of the upper reverser door 202, the lower reverser door 204, and deployable fairing 238 blend with the outer surface of the nacelle, forming a smooth aerodynamic shape of the gas turbine engine. In the same stowed configuration, a mixed gas stream 260 exits the exhaust duct 205 and is generally unaffected by the thrust reverser 200 or its componentry, as the inner surfaces of the upper reverser door 202 and the lower reverser door 204 are blended with the interior surface of the exhaust duct 205 to provide a generally smooth and annular exhaust flow path from downstream of the core engine exhaust to a downstream exit plane or aft end of the thrust reverser 200. While in the stowed position, the mixed gas stream 260 flows out the exhaust duct 205, providing forward thrust necessary to propel the aircraft. In response to the thrust reverser 200 assuming the open or deployed position, e.g., upon landing, the upper reverser door 202 and the lower reverser door 204 are rotated to their open positions (see FIG. 2D). The mixed gas stream 260 is diverted from the exit of the exhaust duct 205 to form a first stream, following an inner surface of the upper reverser door and a second stream 264, following an inner surface of the lower reverser door 204. Both the first stream and the second stream 264 have forward vector components of thrust, which provide the reverse thrust acting on the aircraft.

A central axis A is illustrated extending through the thrust reverser 200. The central axis A may define a fore end or fore direction (negative Z-direction) of the thrust reverser 200 and an aft end or aft direction (positive Z-direction) of the thrust reverser 200. Various embodiments of the disclosure may be described in relation to the central axis A. For example, the upper reverser door 202 may be considered positioned above the central axis A while the lower reverser door 204 may be considered positioned below the central axis A. Similarly, the port side beam 209 may be considered positioned to the port or left side of the central axis A (looking in the fore direction (negative Z-direction)) while the starboard side beam may be considered positioned to the right or starboard side of the central axis A (looking in the fore direction). More generally, reference to a first reverser door may broadly refer to a reverser door positioned opposite a second reverser door with respect to the central axis A, there being no preferred up or down or side to side orientation, while reference to a first side beam may broadly refer to a side beam positioned opposite a second side beam with respect to the central axis A. As used herein, a first component positioned opposite a second component does not imply the second component is a mirror image of the first component or the second component is positioned symmetrically opposite to the first component, though the disclosure contemplates such mirror image and symmetric configurations and positioning.

In various embodiments, actuation arrangement 210 may include one or more components mounted to port side beam 209. Actuation arrangement 210 is configured to facilitate rotation of the deployable fairing 238 between deployed and stowed positions. Deployable fairing 238 may be pivotally coupled to frame 206. Deployable fairing 238 may be pivotally coupled to frame 206 via a hinge, such as hinge 240, located at the forward edge 292 of deployable fairing 238. In this regard, deployable fairing 238 may rotate generally about its forward edge 292. In this regard, the aft edge 294 of deployable fairing 238 may rotate outwards, away from central axis A, in response to deployable fairing 238 rotating about hinge 240. Deployable fairing 238 may be configured to rotate about hinge 240 to a deployed position (see FIG. 2D, also referred to herein as a first position) in response to lower reverser door 204 rotating with respect to frame 206 in a first rotational direction (e.g., see arrow 281 of FIG. 2C). Deployable fairing 238 may be configured to rotate about hinge 240 to a stowed position (see FIG. 2B, also referred to herein as a second position) in response to lower reverser door 204 rotating with respect to frame 206 in a second rotational direction (e.g., opposite rotational direction of arrow 281 of FIG. 2C).

Figure 2C:
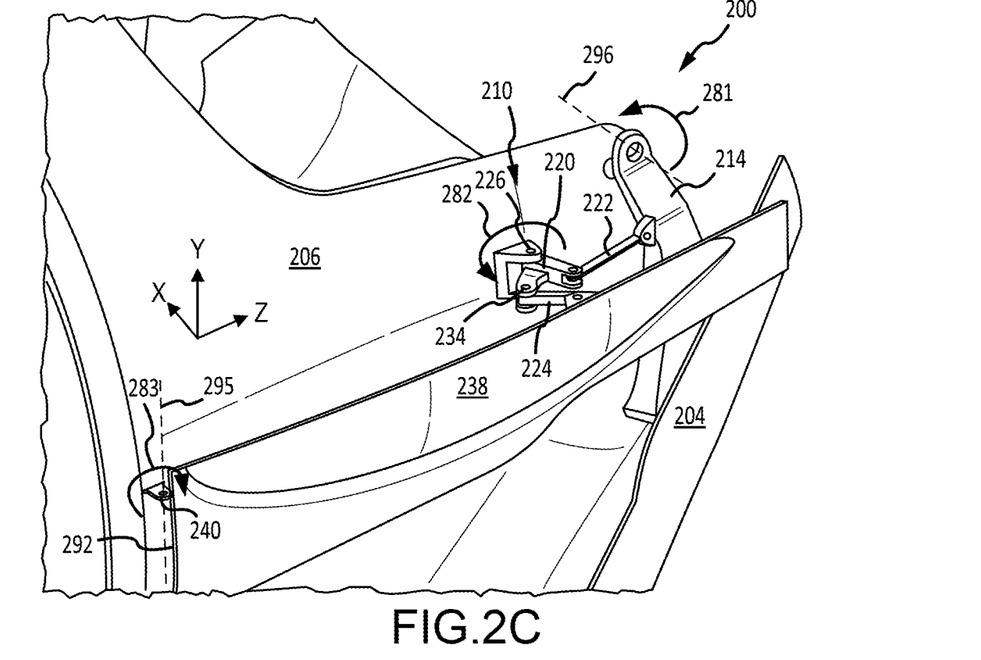
FIG. 2C provides an isometric view of the thrust reverser of FIG. 2B, with the lower reverser door rotated towards a partially open position and the deployable fairing rotated towards a partially deployed position, in accordance with various embodiments.
Figure 2D:
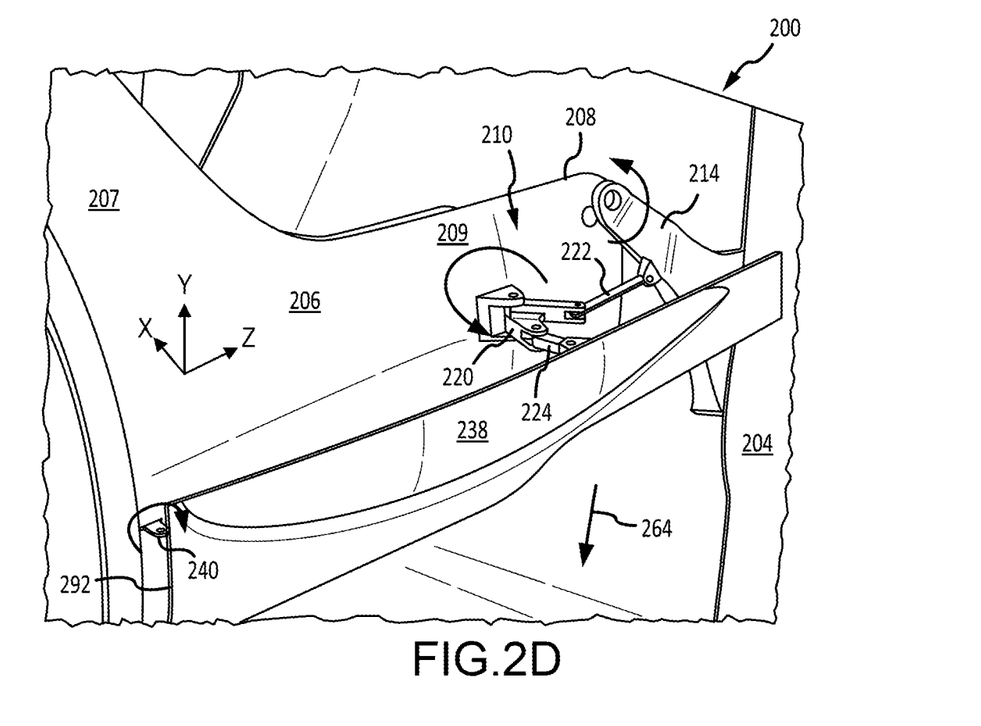
FIG. 2D provides an isometric view of the thrust reverser of FIG. 2B, with the lower reverser door rotated to an open position and the deployable fairing rotated to a deployed position, in accordance with various embodiments.

Deployable fairing is rotated about a first axis 295 (e.g., substantially parallel the Y-axis of FIG. 2C). Lower reverser door 204 may be rotated about a second axis 296 (e.g., substantially parallel the X-axis of FIG. 2C). The first axis 295 may be substantially orthogonal to the second axis 296.

In various embodiments, actuation arrangement 210 may comprise a bell crank 220 pivotally coupled to frame 206, a first link 222 pivotally coupled to hinge member 214, and a second link 224 pivotally coupled to deployable fairing 238. Bell crank 220 may be pivotally coupled to frame 206 via a hinge 226. Bell crank 220 may rotate about hinge 226. A first end of first link 222 may be pivotally coupled to hinge member 214 and a second end of first link 222 may be pivotally coupled to a first pivot point 232 of bell crank 220. A first end of second link 224 may be pivotally coupled to deployable fairing 238 and a second end of second link 224 may be pivotally coupled to a second pivot point 234 of bell crank 220. Although illustrated as being coupled to hinge member 214 for lower reverser door 204, first link 222 may alternatively be coupled to a hinge member for upper reverser door 202, without departing from the scope and spirit of the present disclosure.

Bell crank 220 may be moveable between a first position (see FIG. 2B) corresponding to a stowed position of the deployable fairing 238, and a second position (see FIG. 2D) corresponding to a deployed position of deployable fairing 238. With additional reference to FIG. 2C and FIG. 2D, and in response to lower reverser door 204 rotating towards an open position (see arrow 281), hinge member 214 may rotate with respect to frame 206, thereby urging bell crank 220 to rotate (see arrow 282) with respect to frame 206 via first link 222. As bell crank 220 rotates, second pivot point 234 moves outward (negative X-direction), away from frame 206, pushes on link 224, thereby urging deployable fairing 238 to rotate about hinge 240 (see arrow 283) and out of the way of lower reverser door 204. In this manner, the deployable fairing 238 is rotated to a deployed position in response to lower reverser door 204 moving to an open position. Conversely, the deployable fairing 238 is rotated to a stowed position in response to lower reverser door 204 moving to a closed position. In this regard, deployable fairing 238 may move between the stowed and deployed positions, dependent on the rotational position of lower reverser door 204.

Figure 3A:
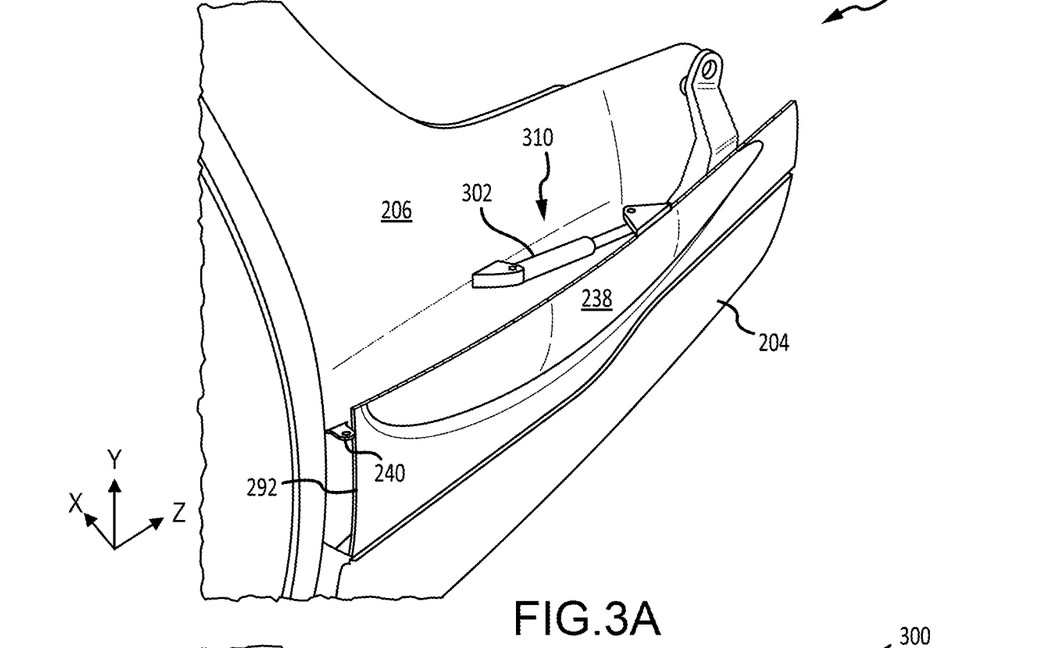
FIG. 3A and FIG. 3B provide isometric views of a thrust reverser comprising an actuation arrangement for a deployable fairing that operates independent of the rotational position of the reverser doors, with the deployable fairing in a stowed position and a deployed position, respectively, in accordance with various embodiments.
Figure 3B:
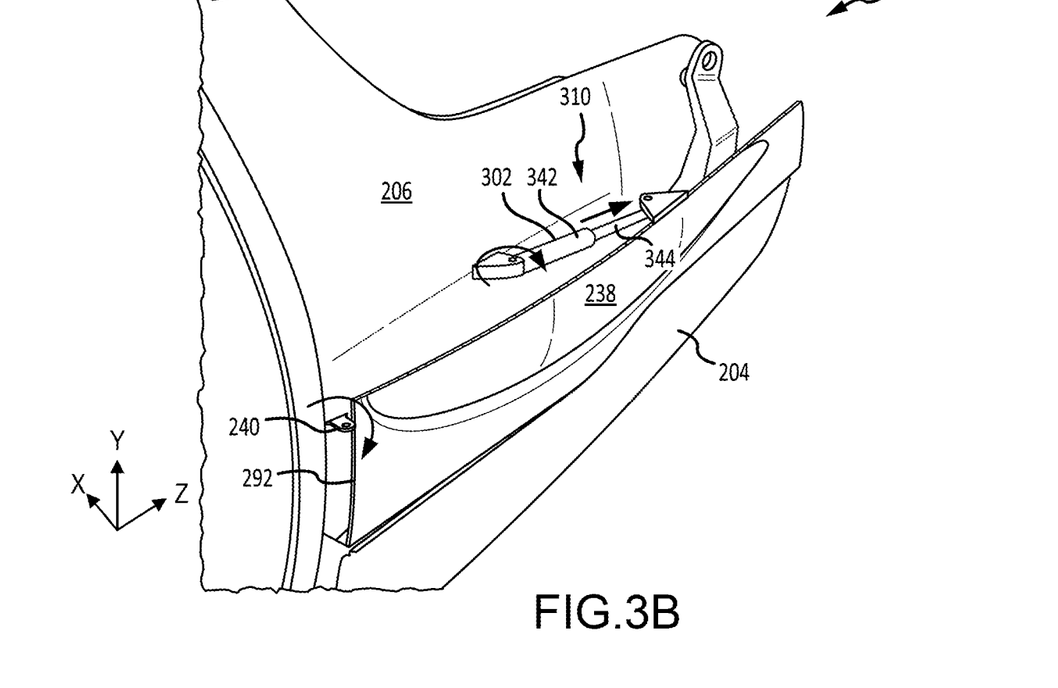

With respect to FIG. 3A and FIG. 3B, elements with like element numbering, as depicted in FIG. 2A through FIG. 2D, are intended to be the same and will not necessarily be repeated for the sake of clarity.

With combined reference to FIG. 3A and FIG. 3B, a deployable fairing 238 is illustrated in a stowed position and a deployed position, respectively, in accordance with various embodiments. Deployable fairing 238 may be moved between the stowed position and the deployed position via an actuation arrangement 310. Actuation arrangement 310 may include a linear actuator 302. Linear actuator 302 may be pivotally coupled to deployable fairing 238. Linear actuator 302 may be pivotally coupled to frame 206. Linear actuator 302 may comprise any suitable actuator for imparting rotational motion to deployable fairing 238, including a mechanical actuator, an electromechanical actuator, a pneumatic actuator, a hydraulic actuator, among others. Linear actuator 302 may comprise a moveable member 344 (e.g., a piston or a plunger) which may extend from an actuator housing 342 to rotate deployable fairing 238 about hinge 240 in a first rotational direction. Conversely, moveable member 344 may retract or compress into actuator housing 342 to rotate deployable fairing 238 about hinge 240 in a second rotational direction. In this regard, deployable fairing 238 may move between stowed and deployed positions in response to linear actuator 302 extending and/or retracting. In this regard, deployable fairing 238 may move between the stowed and deployed positions, independent from the rotational position of lower reverser door 204.

Figure 4:
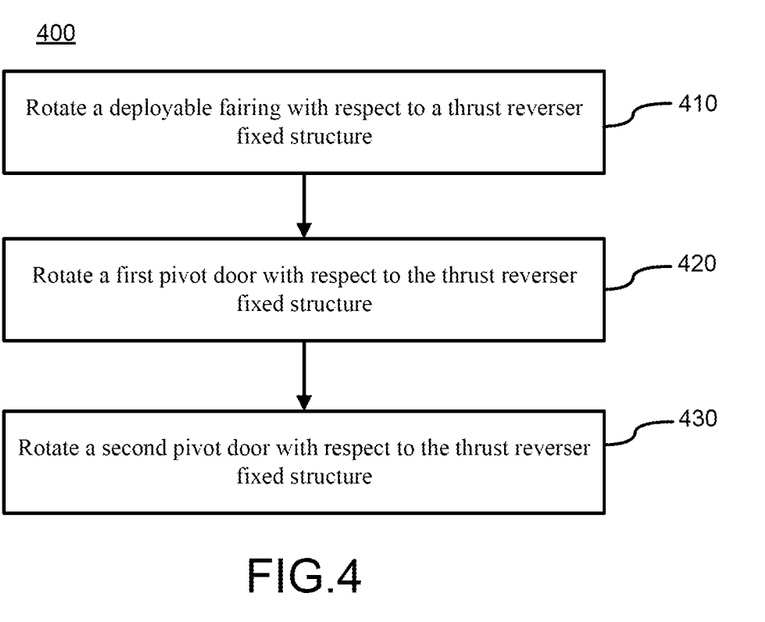
FIG. 4 provides a flow chart illustrating a method of deploying a thrust reverser, in accordance with various embodiments.

With reference to FIG. 4, a method 400 for deploying a thrust reverser is illustrated, in accordance with various embodiments. Method 400 includes rotating a deployable fairing with respect to a thrust reverser fixed structure (step 410). Method 400 includes rotating a first pivot door with respect to the thrust reverser fixed structure (step 420). Method 400 includes rotating a second pivot door with respect to the thrust reverser fixed structure (step 430).

With combined reference to FIG. 2A through FIG. 4, step 410 includes rotating deployable fairing 238 with respect to frame 206. In various embodiments, step 410 includes rotating deployable fairing 238 with respect to frame 206 via actuation arrangement 210 in response to lower reverser door 204 rotating with respect to frame 206 via hinge member 214. In various embodiments, step 410 includes rotating deployable fairing 238 with respect to frame 206 via actuation arrangement 310. Step 420 may include rotating lower reverser door 204 with respect to frame 206. Step 430 may include rotating upper reverser door 202 with respect to frame 206. In various embodiments, step 410, step 420, and step 430 occur simultaneously, for example when implementing actuation arrangement 210. In various embodiments, step 410 occurs before step 420 and step 430, for example when implementing actuation arrangement 310. Upper reverser door 202 and lower reverser door 204 may be rotated with respect to frame 206 via known actuation systems.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A thrust reverser, comprising:
a frame;
a first reverser door pivotally coupled to the frame; and
a deployable fairing pivotally coupled to the frame, wherein the deployable fairing is configured to move away from a central axis of the thrust reverser by rotating about a first axis to provide clearance for the first reverser door to rotate about a second axis substantially orthogonal to the first axis and into a deployed position;
wherein the deployable fairing extends along a peripheral edge of the first reverser door, the peripheral edge extending between and to a forward edge of the first reverser door and an aft edge of the first reverser door.

2. The thrust reverser of claim 1, wherein the deployable fairing is configured to rotate about a hinge with respect to the frame to provide clearance for the first reverser door to rotate into the deployed position.

3. The thrust reverser of claim 2, wherein a forward end of the deployable fairing is pivotally coupled to the frame with the hinge.

4. The thrust reverser of claim 2, further comprising a linear actuator, a first end of the linear actuator is pivotally coupled to the frame and a second end of the linear actuator is pivotally coupled to the deployable fairing, wherein the deployable fairing is moveable between a first position and a second position in response to the linear actuator at least one of extending or retracting.

5. The thrust reverser of claim 4, wherein the linear actuator comprises an actuator selected from the group consisting of a mechanical actuator, an electromechanical actuator, a pneumatic actuator, and a hydraulic actuator.

6. The thrust reverser of claim 4, wherein the linear actuator comprises a moveable member extending from an actuator housing.

7. The thrust reverser of claim 2, wherein the deployable fairing is rotatable between a first position and a second position independent from a rotational position of the first reverser door.

8. The thrust reverser of claim 1, wherein the deployable fairing comprises an aerodynamic surface extending from an aft edge of the first reverser door toward a forward edge of the first reverser door when the first reverser door is in a stowed position.

9. The thrust reverser of claim 1, further comprising a second reverser door pivotally coupled to the frame, wherein the deployable fairing is configured to move away from the central axis of the thrust reverser to provide clearance for the second reverser door to rotate into the deployed position.

10. The thrust reverser of claim 9, wherein the deployable fairing comprises an aerodynamic surface extending circumferentially between and to the first reverser door and the second reverser door.

11. The thrust reverser of claim 10, wherein the aft edge of the first reverser door, an aft edge of the second reverser door, and an aft edge of the deployable fairing are disposed at an aft end of the thrust reverser.

12. A method for deploying a thrust reverser, comprising:
rotating a deployable fairing about a first axis with respect to a frame; and
rotating a first reverser door with respect to the frame from a stowed position to a deployed position about a second axis substantially orthogonal to the first axis, wherein the deployable fairing is configured to move away from a central axis of the thrust reverser to provide clearance for the first reverser door to rotate into a deployed position; wherein rotating the deployable fairing with respect to the frame comprises rotating the deployable fairing with respect to the frame from a first position, wherein the deployable fairing extends along a peripheral edge of the first reverser door, to a second position, wherein an aft edge of the deployable fairing moves away from the central axis of the thrust reverser to provide clearance for the first reverser door to rotate to the deployed position, and the peripheral edge extends between and to a forward edge of the first reverser door and an aft edge of the first reverser door.

13. The method of claim 12, further comprising rotating a second reverser door with respect to the frame.

14. The method of claim 12, wherein the rotating the deployable fairing with respect to the frame comprises rotating the deployable fairing about a hinge disposed at a forward end of the deployable fairing.

15. The method of claim 12, further comprising moving a linear actuator from a retracted position to an extended position, wherein the rotating the deployable fairing with respect to the frame is in response to the moving the linear actuator from the retracted position to the extended position.

16. The method of claim 15, wherein a first end of the linear actuator is pivotally coupled to the frame and a second end of the linear actuator is pivotally coupled to the deployable fairing.

17. The method of claim 16, wherein the linear actuator comprises an actuator selected from the group consisting of a mechanical actuator, an electromechanical actuator, a pneumatic actuator, and a hydraulic actuator.

18. The method of claim 16, wherein the linear actuator comprises a moveable member extending from an actuator housing.

19. The method of claim 13, wherein the deployable fairing is rotatable between the first position and the second position independent from a rotational position of the first reverser door.

\* \* \* \* \*